US010368690B2

(12) United States Patent
Martz et al.

(10) Patent No.: US 10,368,690 B2
(45) Date of Patent: Aug. 6, 2019

(54) SIMPLIFIED CONTROL PANEL FOR A FOOD PREPARATION MACHINE (71) Applicant: NESTEC S.A., Vevey (CH)

(72) Inventors: Nicolas Louis Robert Martz, Guangdong (CN); Markus Steckhan, Mulheim (DE)

(73) Assignee: Societe des Produits Nestle S.A., Vevey (CH)

( * ) Notice: Subject to any disclaimer, the term of this patent is extended or adjusted under 35 U.S.C. 154(b) by 1034 days.

(21) Appl. No.: 14/766,519

(22) PCT Filed: Feb. 8, 2013

(86) PCT No.: PCT/CN2013/071574
§ 371 (c)(1),
(2) Date: Aug. 7, 2015

(87) PCT Pub. No.: WO2014/121520
PCT Pub. Date: Aug. 14, 2014

(65) Prior Publication Data
US 2015/0366398 A1 Dec. 24, 2015

(51) Int. Cl.
A47J 31/56 (2006.01)
A47J 31/40 (2006.01)
(Continued)

(52) U.S. Cl.
CPC ............ A47J 31/56 (2013.01); A47J 31/407 (2013.01); A47J 31/44 (2013.01); A47J 31/46 (2013.01)

(58) Field of Classification Search
CPC .... H01H 13/76; H01H 13/70; H01H 13/7006; H01H 13/70013; H01H 13/72; G01F 13/00; A47J 31/56
(Continued)

(56) References Cited

U.S. PATENT DOCUMENTS 3,366,751 A * 1/1968 Capellari ............. H01H 19/001
                                                          200/11 A
6,809,661 B1 * 10/2004 Badarneh ............... H01H 25/00
                                                          200/61.02
(Continued)

FOREIGN PATENT DOCUMENTS

CN    102170813    8/2011
CN    102573585    7/2012
(Continued)

OTHER PUBLICATIONS

Office Action issued in related Chinese Patent Application No. 201380072409.8 dated Apr. 13, 2017.

Primary Examiner — Ibrahime A Abraham
Assistant Examiner — Spencer H. Kirkwood
(74) Attorney, Agent, or Firm — K&L Gates LLP (57) ABSTRACT A machine (1) for preparing food or beverage products is provided. Said machine (1) is adapted for injecting a fluid under pressure in an ingredient capsule inserted therein. Said machine (1) comprises a fluid reservoir (3), a fluid system, a fluid heating element, and a controller for managing at least one preparation parameter, and further comprises a selector for allowing a user to manually select at least one food or beverage preparation parameter. Said selector comprises a sliding element (10,16) comprising at least two independent switch actuators (23,24), and a contact panel (11) comprising at least two selector switches (21) linked to the machine controller, such that each of said selector switches (21) is actuated or unactuated by the presence or the absence of the corresponding switch actuator (23,24) for each given position of said sliding element (10,16), and such that the simultaneous state of actuation of said switches (21) is interpreted by said controller as a bitmap code for setting at least one corresponding preparation parameter.

9 Claims, 13 Drawing Sheets (51) Int. Cl.
*A47J 31/44* (2006.01)
*A47J 31/46* (2006.01)
*H01H 13/76* (2006.01)

(58) Field of Classification Search
USPC .......................................................... 99/295
See application file for complete search history.

(56) References Cited

U.S. PATENT DOCUMENTS

2007/0056994 A1* 3/2007 Woodnorth ............. A47J 31/46
                                                                     222/221
2008/0210702 A1* 9/2008 Lochinger ............ A47K 5/1217
                                                                     221/7

FOREIGN PATENT DOCUMENTS

| CN | 202537195 | 11/2012 | |
|---|---|---|---|
| EP | 1 992 263 A1 | 11/2008 | |
| EP | 1992263 A1 * | 11/2008 | ............ A47J 31/407 |
| EP | 2196117 | 6/2010 | |
| EP | 2467045 | 6/2012 | |
| EP | 2 528 044 A1 | 11/2012 | |

\* cited by examiner

SIMPLIFIED CONTROL PANEL FOR A FOOD PREPARATION MACHINE

CROSS REFERENCE TO RELATED APPLICATIONS

The present application is a National Stage of International Application No. PCT/CN2013/071574, filed on Feb. 8, 2013, the entire contents of which are being incorporated herein by reference.

FIELD OF THE INVENTION

The present invention concerns a simplified control panel for setting preparation parameters in a food preparation machine, preferably in a beverage preparation machine.

BACKGROUND OF THE INVENTION

In the following description, the invention will be described in relation to a beverage preparation machine. However, the functional principles described therein are applicable more generally to machine for the preparation of non-liquid edible products, such as ice-cream, soups, jellies for instance. The appended claims are therefore meant to encompass application of the present invention to such non liquid food products preparation machines. The following description will therefore concentrate on application of the invention to beverage preparation machines for clarity and simplicity purposes.

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid or semi-rigid capsule.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure inside the capsule chamber during extraction and/or dissolution of the capsule contents is typically about 1 to about 8 bar for dissolution products and about 2 to about 12 bar for extraction of roast and ground coffee. Such a preparation process allows a consumer to prepare a beverage, for instance coffee, within a few seconds.

The principle of extracting and/or dissolving the contents of a closed capsule, preferably under pressure, is known and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule.

Capsules allowing the application of this principle have already been described for example in applicant's European patents no EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

Capsules have been developed for such an application of food preparation, and in particular for beverage preparation, which are described and claimed in applicant's European patent EP 1784344 B1, or in European patent application EP 2062831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted, or a soluble ingredient or mix of soluble ingredients,
- an aluminium membrane disposed at the bottom end of the capsule, closing the capsule, for retaining the internal pressure in the chamber.

The aluminium membrane is designed for being pierced with piercing means that are either integral with the capsule, or located outside of said capsule, for example within a capsule holder of the machine.

The piercing means are adapted for piercing dispensing holes in the aluminium membrane when the internal pressure inside the chamber reaches a certain pre-determined value.

Also, optionally, the capsule can further comprise means configured to break the jet of fluid so as to reduce the speed of the jet of fluid injected into the capsule and distribute the fluid across the bed of substance at a reduced speed.

Capsules of the prior art feature an injection wall or membrane (referred to as top membrane) which is to be pierced by a fluid injection element (e.g. needle) of a beverage preparation machine being part of a fluid system. When fluid is injected in the capsule compartment, a pressure is built up, which serves as an extraction means for extracting and/or dissolving ingredients contained inside the capsule, as described above. Such ingredients can be for instance a bed of roast and ground coffee. Alternatively or in combination with roast and ground coffee, the ingredients can comprise soluble ingredients, such as for instance beverage premixes.

In many instances, the machine comprises a control panel to allow a consumer to select and set a certain number of preparation parameters before starting with the preparation of a food product (e.g. a beverage).

Many machines feature basic selectors, that allow only a limited variation within the selection of one parameter. For instance, concerning the temperature of preparation, basic selectors can include "hot" or "cold", which can be chosen via two corresponding push buttons, or a pull/push lever.

When it comes to preparation parameters which require a finer setting, such as volume for instance, machines of the prior art feature more complex selectors, which allow a consumer to chose between a large number (i.e. typically more than two or three possibilities for setting the parameter). However, the complexity of such "fine-tuning" selectors renders them expensive to produce, which has an obvious impact on the retail price of the machine.

It is therefore a main objective of the present invention to provide a food (e.g. beverage) preparation machine which features at least one selector for selecting at least one food preparation parameter, said selector being as simple and effective in its construction as possible, unlike existing selectors.

SUMMARY OF THE INVENTION

The main objective set out above is met with a machine for preparing food or beverage products, said machine being adapted for injecting a fluid under pressure in an ingredient capsule inserted therein, said machine comprising a fluid reservoir, a fluid system, optionally a fluid heating element, a controller for managing at least one preparation parameter, and further comprising a selector for allowing a user to manually select at least one food or beverage preparation parameter, characterized in that said selector comprises:

(i) a sliding element comprising at least two independent switch actuators, and (ii) a contact panel that comprises at least two switches linked to the machine controller, said switches being located side to side but not aligned to the translation direction of said sliding element, such that each of said selector switches is actuated/unactuated by the presence, respectively the absence of a corresponding switch actuator for each given position of said sliding element, and such that the simultaneous state of actuation of said switches is interpreted by said controller as a bitmap code for setting at least one corresponding preparation parameter.

The preparation parameter preferably comprises the volume of fluid to be injected by said machine within the capsule.

In a highly preferred embodiment of the present invention, the switches are metallic domes.

Furthermore, the at least two actuators advantageously comprise parallel ramp-shaped protrusions with tapered extremities having various lengths and/or being unaligned in the transversal direction.

In a preferred embodiment of the invention, the selector comprises at least three switches and at least three corresponding switch actuators, thus providing at least eight different preparation parameter positions of said selector.

Also, the selector according to the present invention further preferably comprises a locking element for locking the sliding element of the selector in discrete positions corresponding to the different preparation parameter positions of said selector.

More preferably, said locking element comprises a spring-mounted pin of the contact panel and a cooperating surface of the sliding element with a plurality of grooves wherein said pin can be locked, as said sliding element is moved from one position to another.

Said contact panel and said sliding element of the selector are advantageously assembled as a lever that serves to open and close said machine for adapting an ingredient capsule therein. More particularly, this lever serves as opening/closing lever for opening, respectively closing, the brewing cavity located in the extraction head of the machine, for insertion or removal of an ingredient capsule therein/therefrom.

In a preferred embodiment of the invention, the selector comprises selecting position representing means comprising a series of superimposed bars that form the shape of a schematic cup, each bar corresponding to one position of the selector.

Also preferably, the selector further comprises an on/off switch for the machine main connection.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
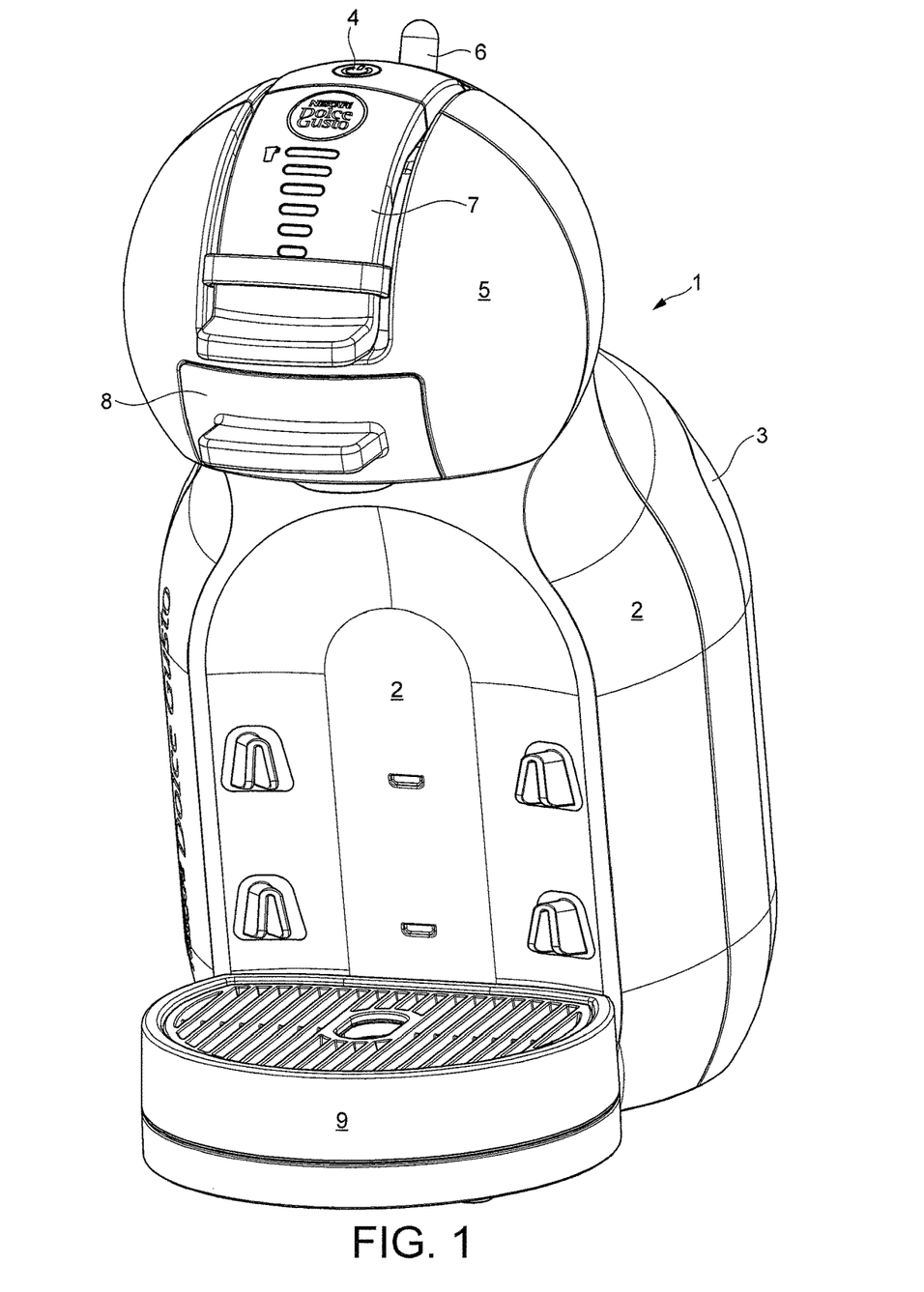
FIG. 1 is perspective front view of a food or beverage preparation machine according to the invention.

The present invention concerns a food or beverage preparation machine illustrated in FIG. 1. For the sake of simplicity, it will be considered in the rest of the description that the machine is for preparing liquid edible food, more precisely beverages. However, the present invention is also suitable for preparing non-beverage products.

As shown in FIG. 1, the machine 1 comprises a machine body 2, a water reservoir 3 that can be removed from the machine body 2 for refill. The body 2 comprises a on/off push button 4. The machine 1 further comprises a extraction head 5 wherein a brewing cavity is delimited that serves to enclose an ingredient capsule (not represented). The machine head 5 comprises a water temperature selector 6 for hot or cold water, a locking lever 7, and a capsule holder 8 that is removable from the extraction head. The machine also comprises an electronic controller (not illustrated in the drawing) which serves to manage the functional elements of the machine, and in particular, controls some of the beverage preparation parameters of the machine such as water temperature, pressure provided by the water pump that pumps water from the reservoir towards the capsule where said water is injected, and also the volume of water that is injected into said capsule, that is a direct function of the volume of beverage that is dispensed into the consumer's cup. The machine 1 further comprises a cup tray 9, for holding a cup under the extraction head.

A capsule (not shown) can be loaded within the capsule holder 9, and both can then be inserted into the extraction head 5 when the latter is in the open position. In that open position, the locking lever 7 is in the upward position, unlocked. The extraction head 5 holds a movable needle plate (not illustrated) with a needle adapted for piercing through a wall of the capsule and injecting water (or another fluid) under pressure within the capsule. Water under pressure is pumped by a pump of the machine, from the water reservoir 3, through a system of pipes (not illustrated) and fluid connectors of the extraction head. When the extraction head 5 is in the open position, the needle plate is placed away from the capsule holder, as well as the needle which is distant from the capsule.

When the consumer actuates the locking lever 7 downwards as shown in FIG. 1, the needle plate is moved towards the capsule holder and the capsule contained therein, and the extraction head 5 is closed. In that position, the needle pierces through the top wall of the capsule, and is in proper configuration for water injection under pressure therein.

In other words, as can be understood, the extraction head 5 of the machine comprises a capsule cavity having a volume and shape substantially similar to the external volume and shape of a capsule. The capsule receptacle of said extraction head is defined by the capsule holder 9 and the needle plate located above the capsule holder. The needle plate is movable substantially vertically towards, and away from, said capsule holder, in order to respectively close, and open the capsule receptacle. When the needle plate is lifted away from the capsule holder, i.e. when the extraction head is in the open position, the capsule holder can be moved into, or out of, the extraction head by sliding it like a drawer. FIG. 1 shows the extraction head closed. In that closed position, the external volume and shape of the capsule generally correspond and fit to the volume and shape of the receptacle defined by the capsule holder and needle plate.

According to the invention, the machine 1 comprises a selector for allowing a user to manually select at least one food or beverage preparation parameter. As illustrated in FIG. 1, the selector is combined with the locking lever 7. The structure and functioning of the selector will be described in more detail in the following.

Figure 2:
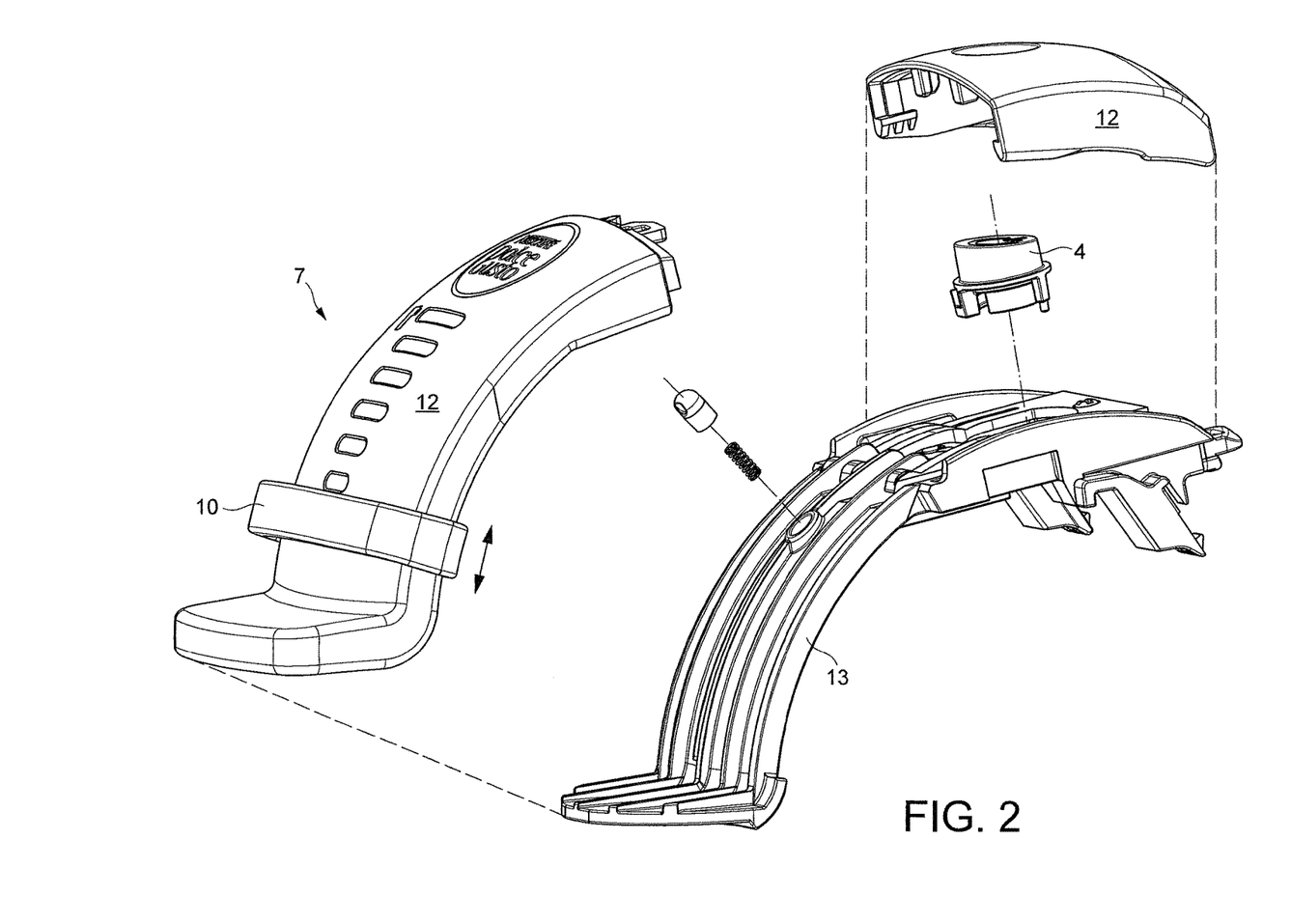
FIG. 2 is a side perspective schematic partially split view of a selector according to the invention.

As illustrated in FIG. 2, the selector comprises:
(i) a sliding element 10 comprising three independent switch actuators (shown in FIG. 7), and
(ii) a contact panel 11 that comprises three switches linked to the machine controller, said switches being located side to side but not aligned to the translation direction of said sliding element, and
(iii) an intermediary switch element that transmits actuation pressure from the switch actuators to the switches.

Figure 3:
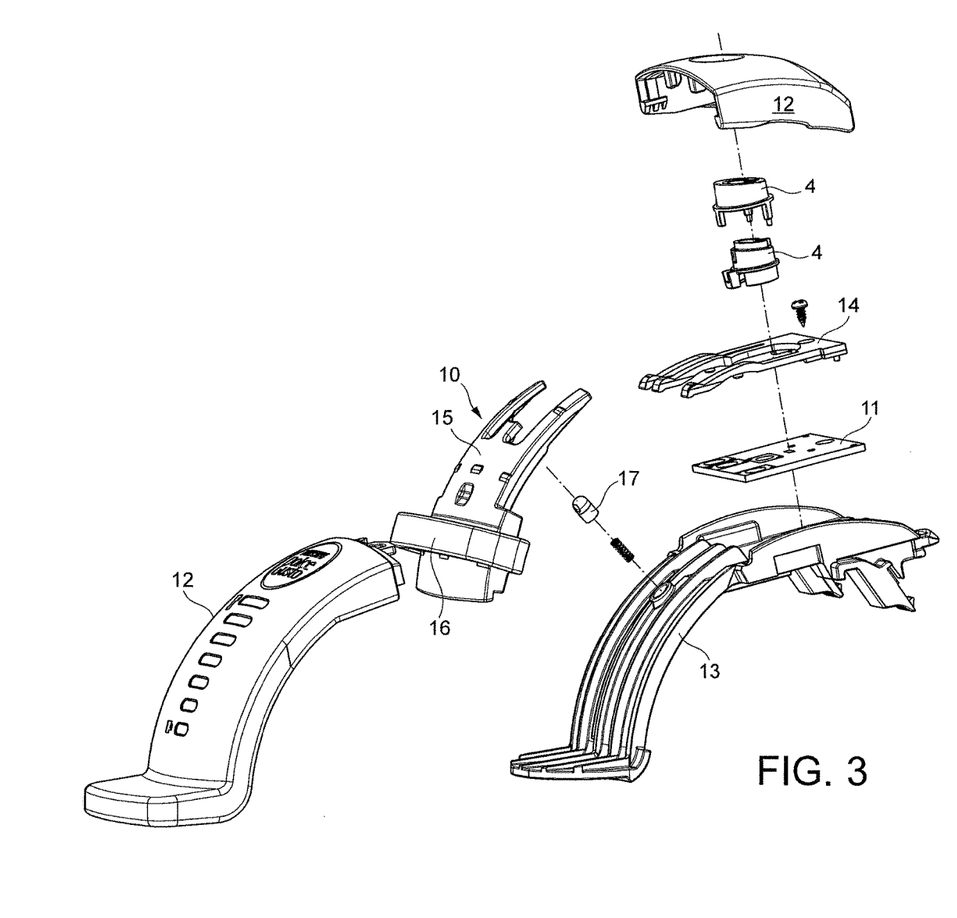
FIG. 3 is a fully split view of the same selector.

As illustrated in FIGS. 2 and 3, the selector is combined with the locking lever 7. However, the functional parts of the selector described above could alternatively be integrated to the machine so as to be separate from the locking lever 7.

The sliding element 10 is mounted in sliding arrangement on the top cover 12 of the locking lever. The sliding freedom of liberty direction of said sliding element 10 is illustrated with a double arrow in FIG. 2.

As shown in FIG. 3, the contact panel 11 and the intermediary switch 14 of the selector is mounted as a stationery part of the base 13 of the locking lever 7.

More precisely, as illustrated in FIG. 3, the sliding element 10 comprises a main body 15 and a ring-shaped handle portion 16 which is handled by the user to slide the element 10.

The intermediary switch element 14 is also assembled to the base element 13 of the locking lever 7, as a superimposed element onto the control panel 11, as shown in FIG. 3.

The selector further comprises a locking element for locking the sliding element of the selector in discrete positions corresponding to the different preparation parameter positions of said selector, as illustrated also in FIG. 3. The locking element comprises a spring-mounted pin 17 that is attached to the contact panel—in this case it is attached to the base 13 of the locking lever 7 which serves as a base for the control panel—. The spring-mounted pin 17 cooperates with a surface of the sliding element that will be described hereafter with reference to FIG. 7, so as to block the sliding movement of the sliding element in predetermined positions that correspond to given activation state of the control panel selector switches. The detail of these predetermined positions will be described in more detail hereafter with reference to FIGS. 7 to 13. The number of possible preparation parameter positions of the selector is determined by the number n of selector switches 21 (and corresponding switch activating elements). More precisely, the number f of selector positions is given by:

$$f=2^n$$

Figures 4A, 4B:
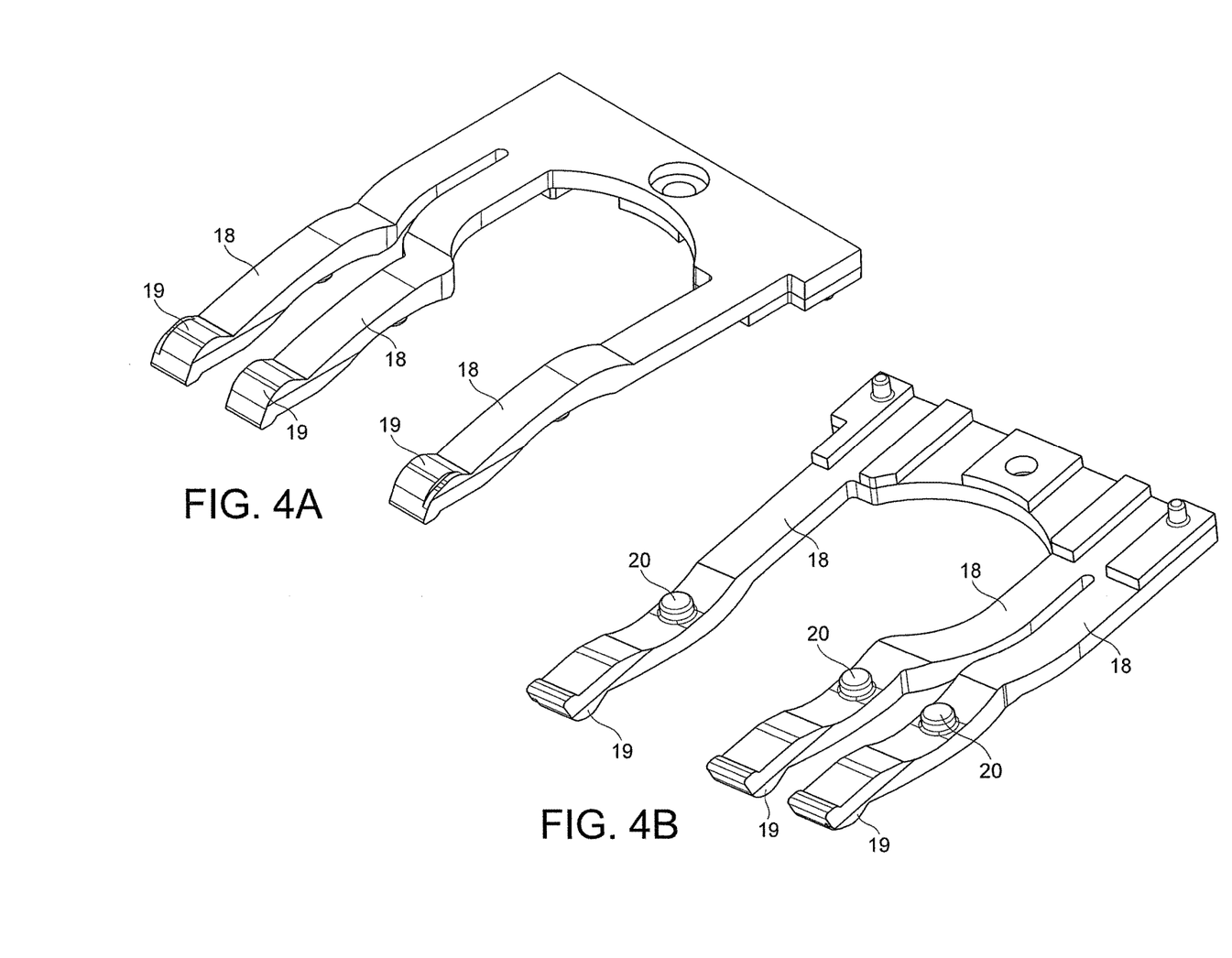
FIGS. 4A and 4B are top perspective, respectively bottom perspective, views of an intermediary switch element for a selector of the invention.
Figure 5:
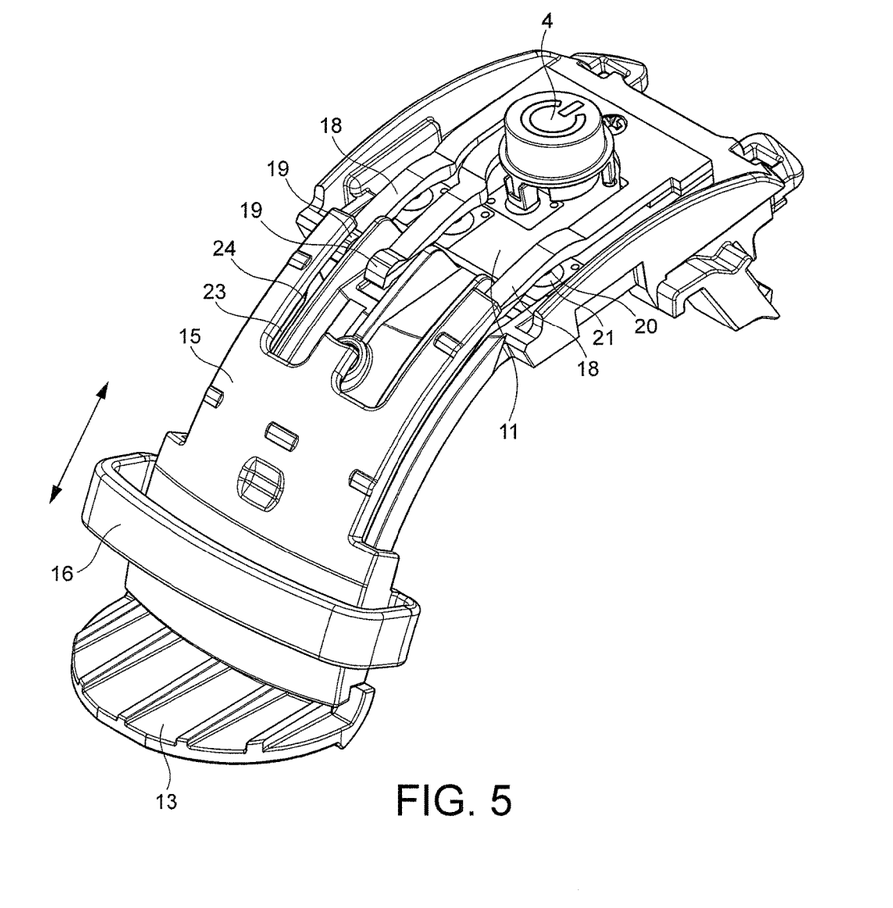
FIG. 5 is a top perspective view of a selector according to the invention without its top cover.
Figure 6:
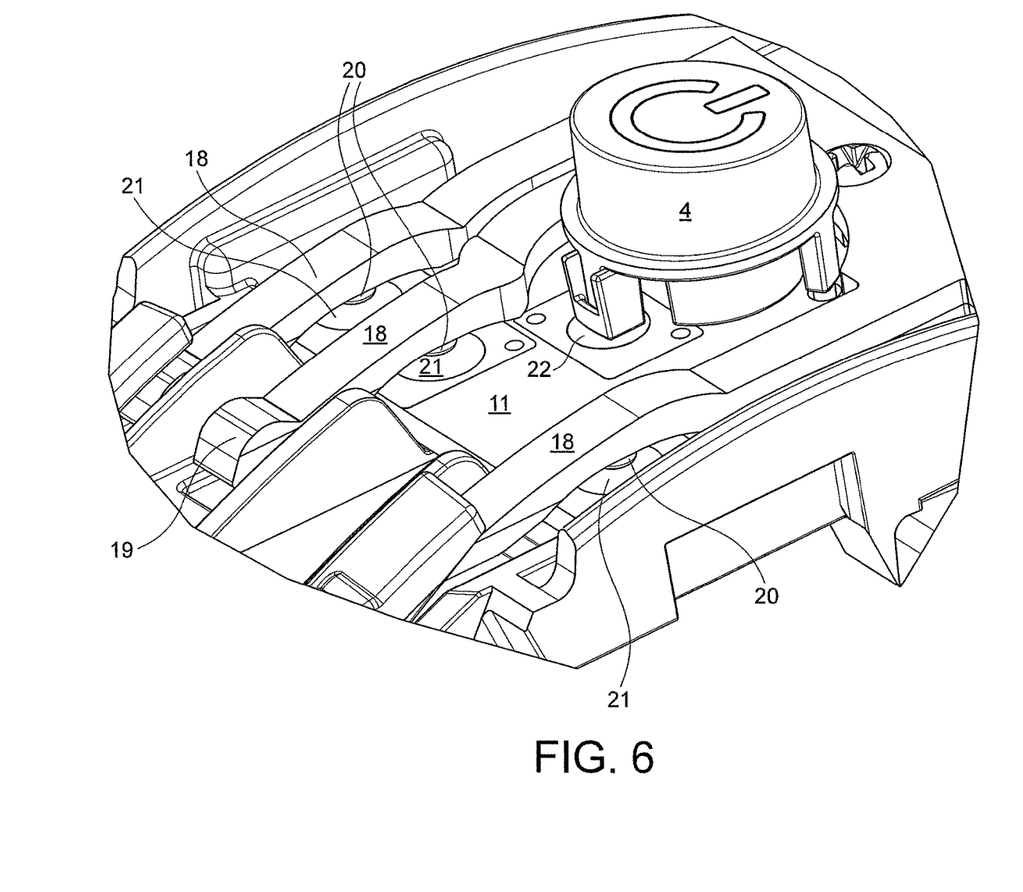
FIG. 6 is an enlarged partial view similar to FIG. 5.

The intermediary switch element 14 is described in greater detail in FIGS. 4A and 4B. It comprises three flexible arms 18 (the number of which corresponds to the number of switches of the control panel and also to the number of switch actuators of the sliding element). Each arm 18 has a distal end having a rounded upper protrusion 19. Each arm 18 further comprises on its lower side a downwardly-extending protuberance 20, each of which faces a switch 21 of the contact panel when the intermediary switch element 14 and the contact panel 11 are assembled together functionally. In the rest configuration, each arm 18 rests against, or in the vicinity of, the contact panel such that the protuberances do not press onto the selector switches 21 of the contact panel, as illustrated in FIGS. 5 and 6. As illustrated in FIG. 6, the contact panel 11 further comprises a specific on/off switch 22 which is functionally linked to the on/off push button 4. This on/off switch 22 is not to be considered in the group of selector switches 21 as it is not used for selecting and coding a beverage preparation parameter, but rather only to turn the machine 1 on or off.

The selector switches 21 and on/off switch 22 of the contact panel are metal dome switches (i.e. metal domes).

Metal domes (metal snap domes, or tactile metal domes), generally made of stainless steel, are momentary switch contacts that, when used in conjunction with a printed circuit board, flex circuit, or membrane, become normally-open tactile switches. Their main advantage over e.g. silicone switches is that in case a switch stays activated by keeping a pressure onto it, a permanent deformation may happen overtime, which leads to the switch being activated, even though no pressure is exerted thereon. Such a permanent deformation would be of course highly undesirable. In the present invention, the user may indeed leave the selector in a position wherein at least one of the switches is pressed over a long period of time. Use of metal dome switches is therefore a particular advantage in that case.

Figure 7:
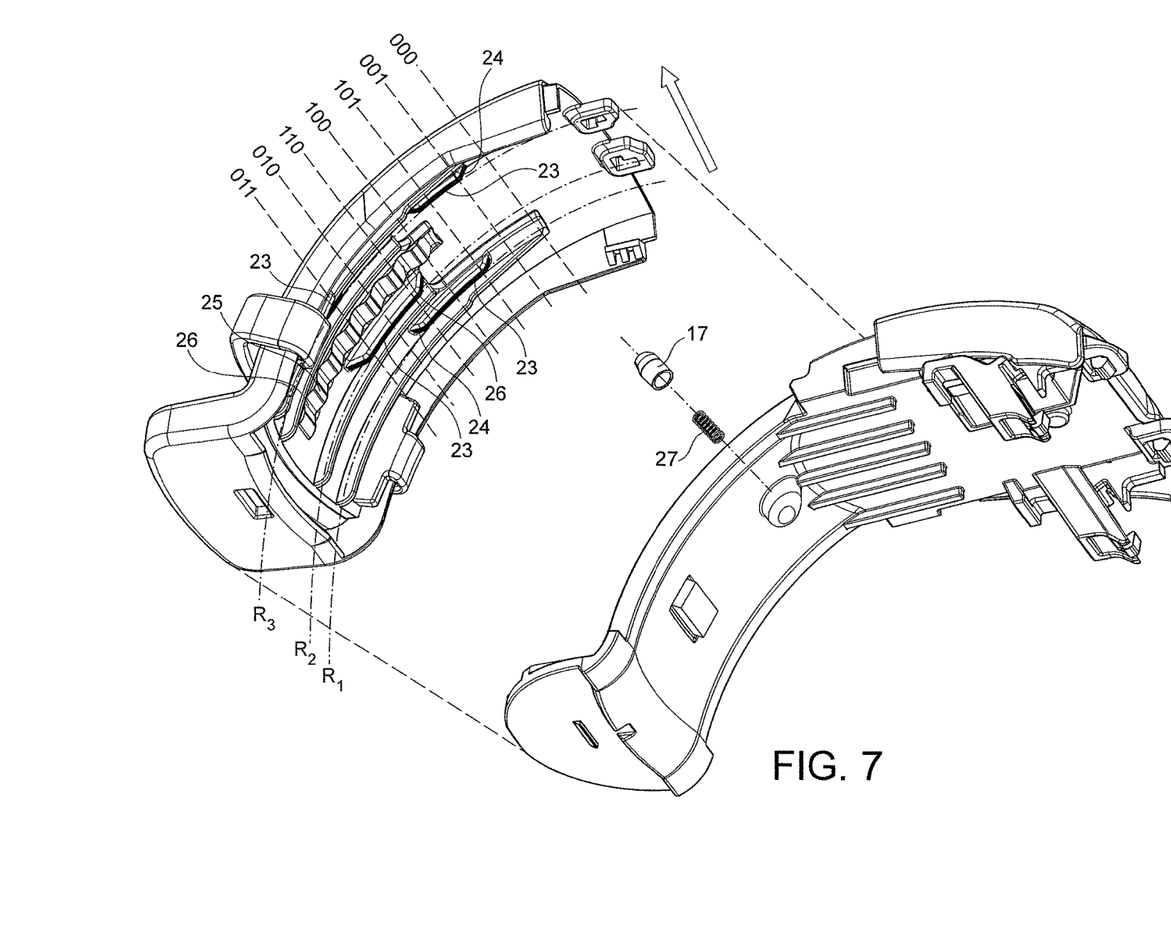
FIG. 7 is a bottom perspective, partially split, view of the same selector.

The lower side of the sliding element is illustrated in FIG. 7 (shown assembled to the top cover 12 of the locking lever 7). The sliding element 10 comprises three independent switch actuators. The switch actuators take the form of four parallel ramp-shaped protrusions 23 with tapered extremities 24. As illustrated in FIG. 7, the ramp-shaped protrusions 23 have various lengths and are not aligned in the transversal direction. The number of protrusions 23 is not critical, but there must be at least as many protrusions 23 as the number of switches 21 on the contact panel. It is however important that the ramp-shaped protrusions 23 be aligned along as many rows as the number of selector switches 21 on the contact panel 11. In the embodiment represented in FIG. 7, the ramp-shaped protrusions 23 are aligned along three parallel rows R1, R2, R3, that are spaced from one another with the same distance as the one that separates the three selector switches 21 on the contact panel.

When the selector is functionally assembled, i.e. when the sliding element 10, contact panel 11, and intermediary switch element 14 are functionally connected to one another, the ramp-shaped protrusions 23 are aligned such that when the sliding element 10 is moved, said protrusions 23 are displaced in directions which correspond to the longitudinal axis of the flexible arms 18 of the intermediary switch element 14. During the sliding movement of the sliding element 10, the tapered extremity 24 of one or several protrusion(s) 23 may come in contact with the rounded distal protrusions 19 of one or several corresponding flexible arm(s) 18, as illustrated in FIGS. 5 and 7.

As explained above, the sliding element 10 can be held in several predetermined positions, by means of a locking element that comprises the spring-mounted pin 17 of the contact panel, and a cooperating surface 25 located at the lower side of the sliding element. The surface 25 comprises a plurality of grooves 26. The spring-mounted pin 17 can be removably locked into each groove 26 and is maintained therein by the force of the spring 27. Therefore, when the pin 17 is removably locked into a groove 26, the sliding element 10 is in a stable position. As said sliding element is moved from one position to another by manually pulling or pushing it, the spring-mounted pin 17 is alternatively blocked into, then moves out of, the grooves 26. In order to provide a relatively smooth sliding movement of the sliding element 10, the series of grooves are aligned along the surface 25 to form a wave-shaped profile, as illustrated in FIG. 7.

In FIG. 7, the various stable positions of the sliding element relative to the contact panel are represented by dotted lines. More precisely, each stable position of said sliding element 10 corresponds to a position of the different switch actuators relative to their corresponding flexible arms 18 and selector switches 21.

When a switch actuator 23 comes into contact with a corresponding distal protrusion 19 of a flexible arm 18, the ramp shape of said actuator 23 flexes said arm 18 towards the corresponding switch 21 of the contact panel 11 which actuates said switch 21 in the "on" position. For a given position of the sliding element 10, each of the three switches 21 of the contact panel is in a given actuation state, depending on whether a ramp-shaped switch actuator 23 faces each switch, or not, as represented in FIG. 7. Therefore, each of said switches 21 is actuated or de-actuated by the presence or absence of a corresponding actuator 23 when said sliding element is moved from one position to another, and such that each simultaneous state of actuation of said switches 21 is interpreted by said controller as a bitmap code for setting at least one corresponding preparation parameter (e.g. the volume of water to be pumped from the reservoir and injected into the capsule).

In FIG. 7, the bitmap code corresponding to one position of the sliding element 10 is to be read in the direction given by the double arrow.

The various positions and the corresponding bitmap coding will now be described in reference to the machine embodiment shown in FIG. 7, starting from the top dotted line.

The top dotted line corresponds to the position of the sliding element 10 without switch actuator actuating contact panel switches 21 (via the flexible arms of the intermediary switch element 14) in any of the three rows of actuation R1, R2, R3. When the sliding element 10 is in this position where the switches 21 of the contact panel are facing this first line, none of said switches is turned on. The corresponding bitmap code interpreted by the machine electronic controller is therefore "000". This code corresponds to the lowermost position of the movable sliding element 10 relative to the stationary contact panel 11, as shown in FIG. 1. When set in that position, the machine pumps the smallest volume of water from the reservoir and a very short cup of beverage in prepared such as ristrettos.

Figure 8:
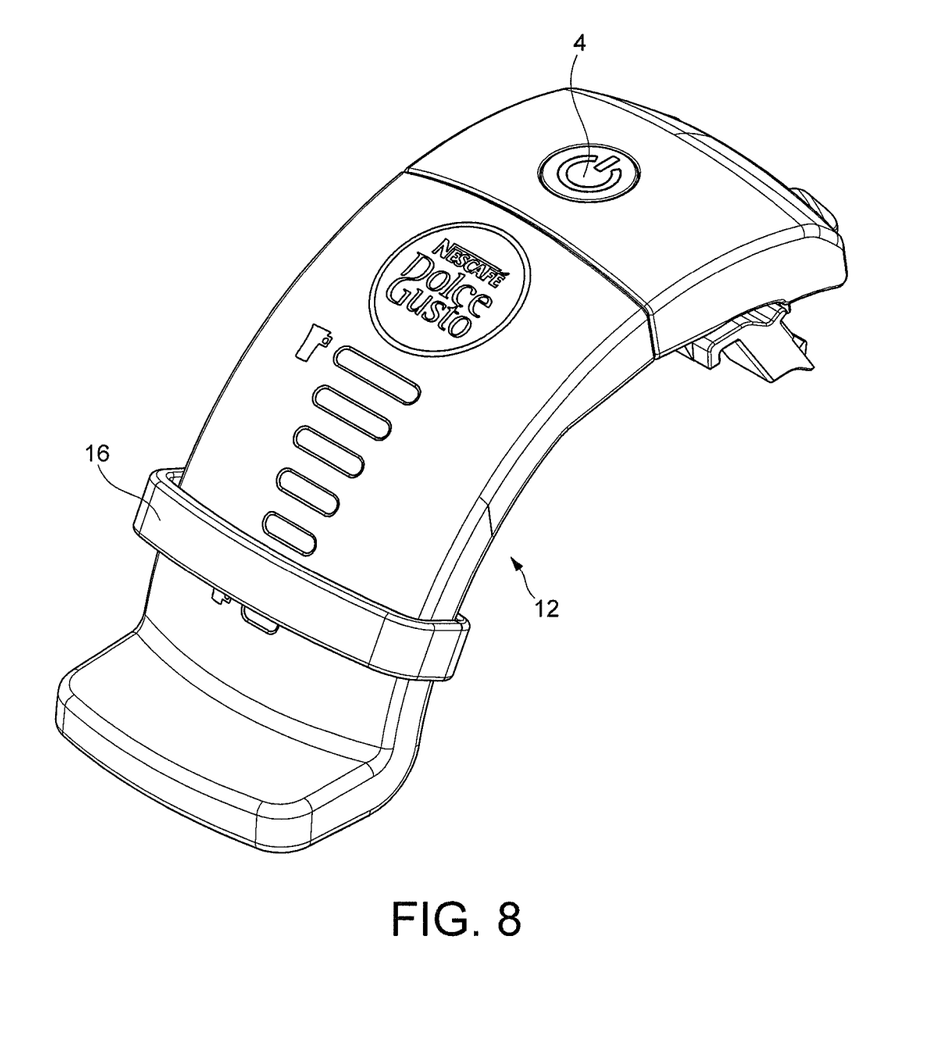
FIGS. 8 to 13 are front perspective views of a selector according to the invention, each showing a different position of the sliding element.
Figure 9:
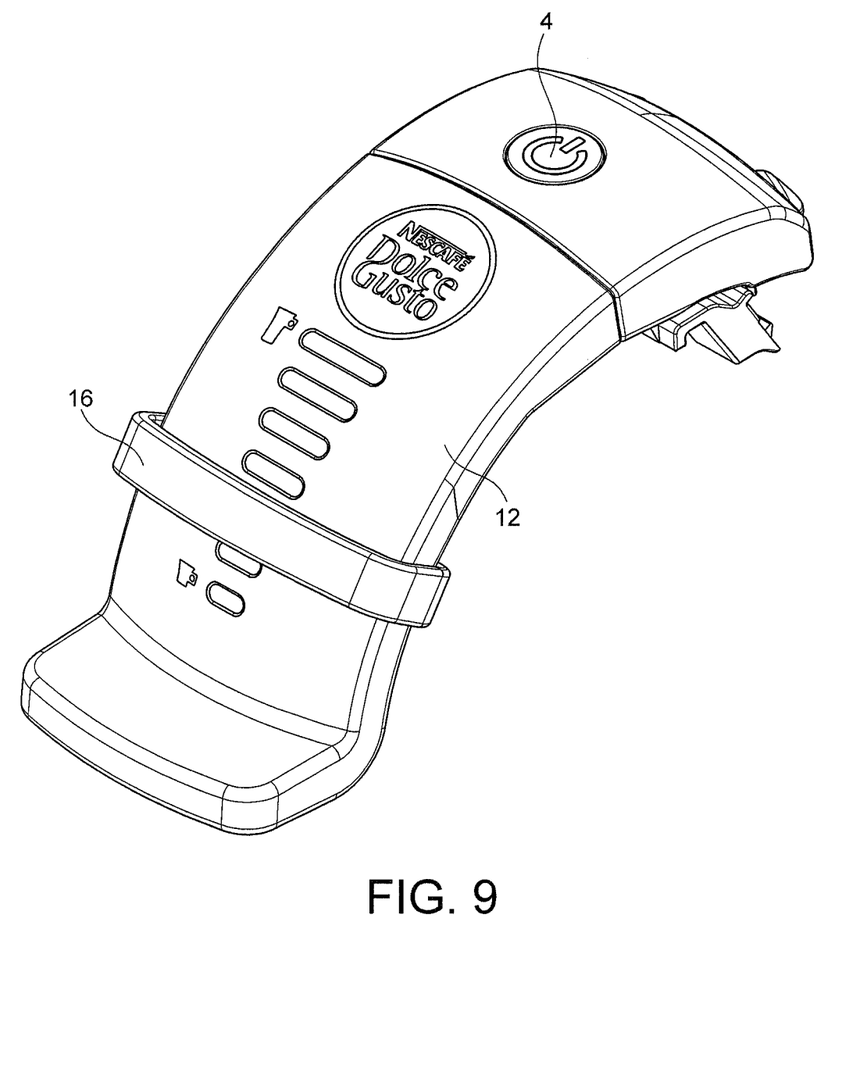
Figure 10:
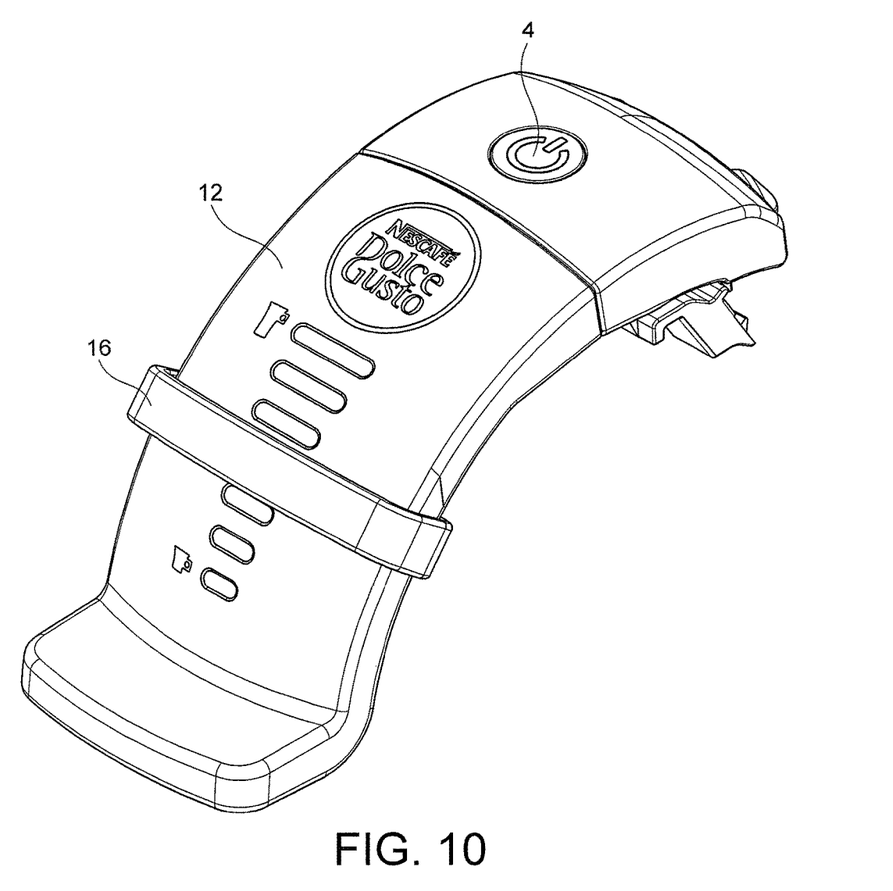
Figure 11:
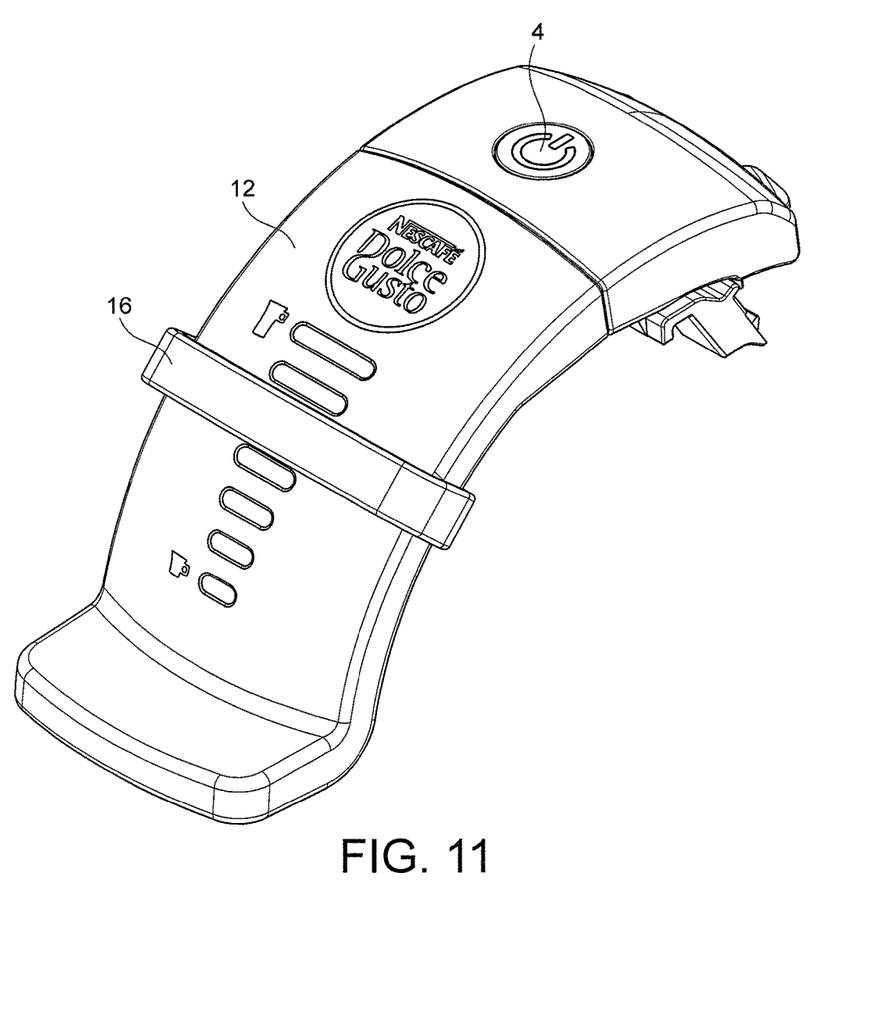
Figure 12:
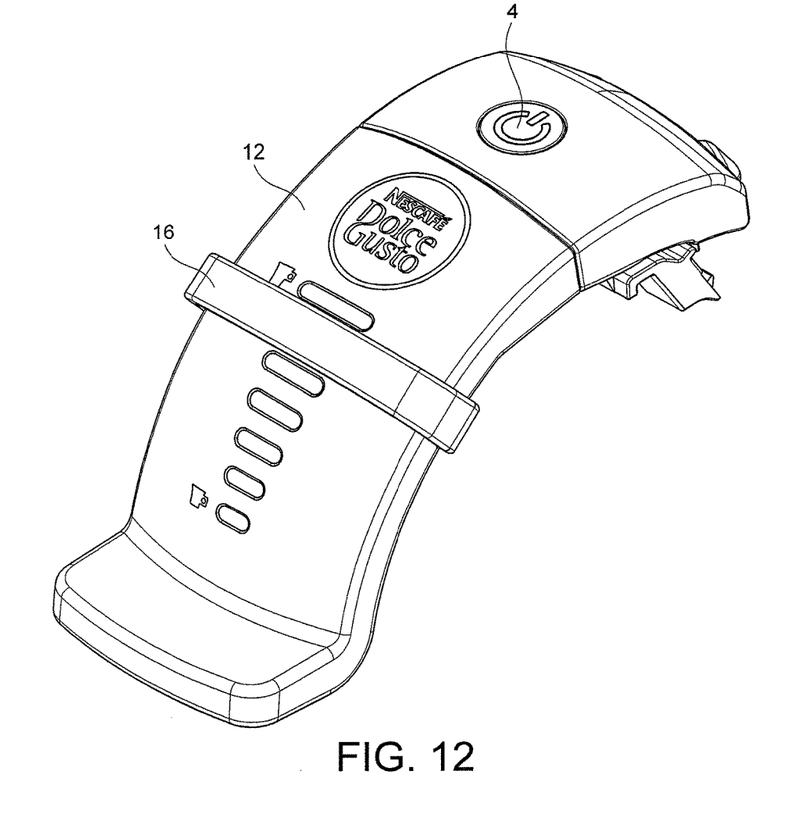
Figure 13:
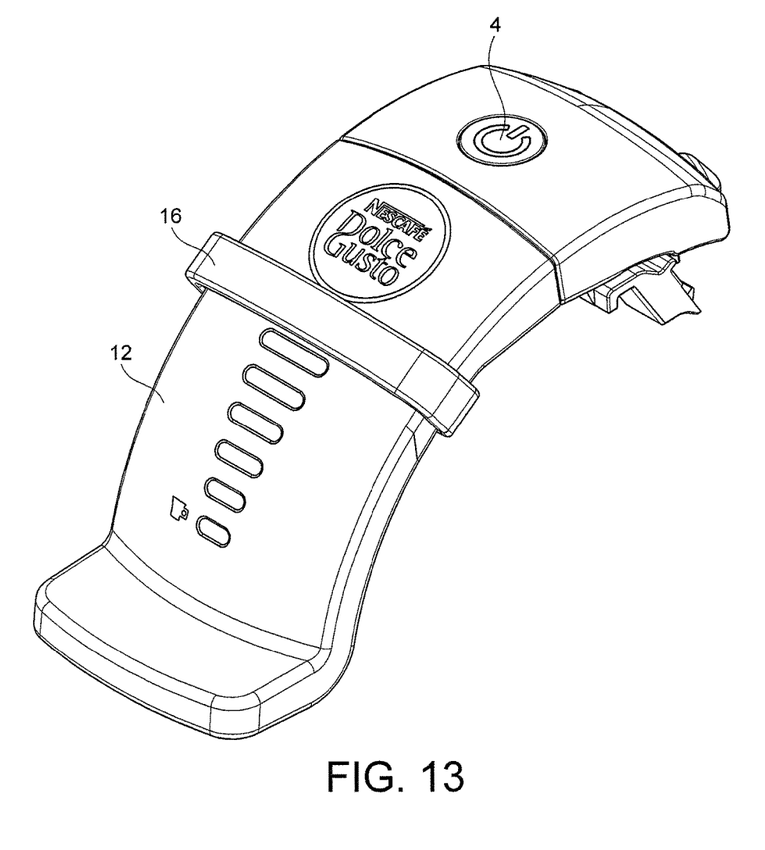

In the second position of the sliding element 10 (second dotted line from the top in FIG. 7), the switch 21 in row R1 is not actuated (there is no ramp-shaped switch actuator facing that switch in that row). The switch corresponding to row R2 is not actuated either. The switch located in row R3 however is actuated by the switch actuator 23 of row R3. The corresponding bitmap code is therefore "001". This bitmap code corresponds to the position of the sliding element 10 as illustrated in FIG. 8, where the machine is set to dispense a slightly larger volume of beverage into the cup, that corresponds for instance to short cup coffee like espressos.

In the third position of the sliding element (shown in FIG. 9), the switch 21 of row R1 is actuated, the switch of row R2 is not, and the switch of row R3 is actuated. The corresponding bitmap code is "101".

In the fourth position of the sliding element (shown in FIG. 10), the switch 21 of row R1 is actuated, but the switches of rows R2 and R3 are not. The corresponding bitmap code is "100".

In the fifth position of the sliding element (shown in FIG. 11), the switch 21 of row R1 is actuated, the switch of row R2 is actuated, and the switch of row R3 is not actuated. The corresponding bitmap code is "110".

In the sixth position of the sliding element (shown in FIG. 12), the switch 21 of row R1 is not actuated, the switch of row R2 is actuated, and the switch of row R3 is not actuated. The corresponding bitmap code is "010".

Finally, in the seventh position of the sliding element (shown in FIG. 13), the switch 21 of row R1 is not actuated (no switch actuator 23 presses onto the switch in row R1), the switch of row R2 is actuated, as well as the switch of row R3. The corresponding bitmap code is "011". This corresponds to the largest volume selection, for preparing long coffee cups for instance, or tea mugs.

The bitmap code that is thus created can be used not only for volume selection as described above. Alternatively, it could be used for other types of beverage preparation parameters.

The selector of the invention is particularly inexpensive to produce and very reliable as it involves few electronic parts which are usually the major causes of wearing and machine breaks, especially in a environment like that of a beverage preparation machine where water vapour is generated.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A machine for preparing food or beverage products, the machine being adapted for injecting a fluid under pressure in an ingredient capsule inserted therein, the machine comprising a fluid reservoir, a fluid system, a controller for managing at least one food or beverage preparation parameter, and a selector for allowing a user to manually select the at least one food or beverage preparation parameter, the selector comprises:
   (i) a sliding element comprising at least two independent switch actuators, the at least two independent switch actuators comprising at least two parallel ramp-shaped protrusions with tapered extremities having various lengths and/or being unaligned in the transversal direction; and
   (ii) a contact panel that comprises at least two selector switches linked to the controller,
   such that each of the at least two selector switches is actuated/un-actuated by the presence, or respectively the absence, of a corresponding switch actuator for each given position of the sliding element, and the simultaneous state of actuation of the at least two independent switches is interpreted by the controller as a bitmap code for setting the at least one food or beverage preparation parameter.

2. The food or beverage preparation machine according to claim 1, wherein the at least one food or beverage preparation parameter comprises a volume of fluid to be injected by the machine within the ingredient capsule.

3. The food or beverage preparation machine according to claim 1, wherein the at least two selector switches are metallic domes.

4. The food or beverage preparation machine according to claim 1, wherein the selector comprises at least three selector switches and at least three corresponding independent switch actuators, thus providing at least eight different preparation parameter positions of the selector.

5. The food or beverage preparation machine according to claim 1, wherein the selector comprises a locking element configured for locking the sliding element of the selector in discrete positions corresponding to the different preparation parameter positions of the sliding element.

6. The food or beverage preparation machine according to claim 5, wherein the locking element comprises a spring-mounted pin of the contact panel and further comprises a cooperating surface of the sliding element with a plurality of grooves wherein the pin can be removably locked as the sliding element is moved from one position to another.

7. The food or beverage preparation machine according to claim 1, wherein the contact panel and the sliding element of the selector are assembled as a lever configured to open and close the machine for receiving the ingredient capsule therein.

8. The food or beverage preparation machine according to claim 1, wherein the selector comprises a selecting position representing member comprising a series of superimposed bars, the superimposed bars form the shape of a schematic cup, and wherein each of the superimposed bars corresponds to one position of the selector.

9. The food or beverage preparation machine according to claim 1, wherein the selector comprises an on/off switch for a machine main connection.

* * * * *